(12) United States Patent
Rising, III

(10) Patent No.: US 6,445,834 B1
(45) Date of Patent: Sep. 3, 2002

(54) MODULAR IMAGE QUERY SYSTEM

(75) Inventor: Hawley Knox Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/175,155

(22) Filed: Oct. 19, 1998

(51) Int. Cl.[7] .............................. G06K 9/54; G06F 7/10
(52) U.S. Cl. .................... 382/305; 382/190; 382/205; 707/3; 707/4
(58) Field of Search ................................. 382/190, 195, 382/201, 305, 209, 220; 358/512; 707/4, 7, 102, 104, 3, 5; 379/201; 434/323

(56) References Cited

U.S. PATENT DOCUMENTS

| | | | |
|---|---|---|---|
| 4,646,250 A | 2/1987 | Childress | 364/518 |
| 4,672,683 A | 6/1987 | Matsueda | 382/57 |
| 4,716,404 A | 12/1987 | Tabata et al. | 340/723 |

(List continued on next page.)

OTHER PUBLICATIONS

Berry, M., Dumais, S., and Letsche, T., "Computational Methods for Intelligent Information Access," Association for Computer Machinery, Inc., pp. 1–38, 1995.

(List continued on next page.)

*Primary Examiner*—Leo Boudreau
*Assistant Examiner*—Kanji Patel
(74) *Attorney, Agent, or Firm*—Blakely, Sokoloff, Taylor & Zafman LLP

(57) ABSTRACT

An image query and storage apparatus and method including a plurality of dynamically linkable feature modules is disclosed. Each of the plurality of feature modules extract a different set of feature information from an input image. The method and apparatus further includes a database coupled to the plurality of feature modules. The database includes storage for the different set of feature information for each of the plurality of feature modules. The method and apparatus support a query by image content of the database of images using the dynamically linked plurality of feature modules. The method and apparatus further includes a plurality of dynamically linkable scoring modules for processing feature specific scoring information generated by the feature modules.

38 Claims, 11 Drawing Sheets

U.S. PATENT DOCUMENTS

| | | | | |
|---|---|---|---|---|
| 4,739,407 A | * | 4/1988 | Mack et al. | 358/188 |
| 4,829,453 A | | 5/1989 | Katsuta et al. | 364/521 |
| 4,850,025 A | | 7/1989 | Abe | 382/9 |
| 4,944,023 A | | 7/1990 | Imao et al. | 382/37 |
| 5,012,334 A | | 4/1991 | Etra | 358/102 |
| 5,049,986 A | | 9/1991 | Aono et al. | 358/80 |
| 5,093,867 A | | 3/1992 | Hori et al. | 362/8 |
| 5,148,522 A | | 9/1992 | Okazaki | 395/161 |
| 5,179,652 A | | 1/1993 | Rozmanith et al. | 395/155 |
| 5,202,828 A | | 4/1993 | Vertelney et al. | 364/419 |
| 5,220,648 A | | 6/1993 | Sato | 395/146 |
| 5,249,056 A | | 9/1993 | Foung et al. | 358/214 |
| 5,363,477 A | | 11/1994 | Kurangano et al. | 395/126 |
| 5,381,158 A | | 1/1995 | Takahara et al. | 345/156 |
| 5,384,719 A | | 1/1995 | Baker et al. | 364/578 |
| 5,404,396 A | * | 4/1995 | Brennan | 379/201 |
| 5,421,008 A | | 5/1995 | Banning et al. | 395/600 |
| 5,428,727 A | | 6/1995 | Kurosu et al. | 395/147 |
| 5,432,893 A | | 7/1995 | Blasubramanian et al. | 395/131 |
| 5,434,966 A | | 7/1995 | Nakazawa et al. | 395/161 |
| 5,448,631 A | * | 9/1995 | Cain | 379/201 |
| 5,452,370 A | | 9/1995 | Nagata | 382/153 |
| 5,469,209 A | | 11/1995 | Gunday et al. | 348/96 |
| 5,469,512 A | | 11/1995 | Fujita et al. | 382/118 |
| 5,530,869 A | * | 6/1996 | Salle | 395/700 |
| 5,544,284 A | | 8/1996 | Allebach et al. | 395/131 |
| 5,572,727 A | * | 11/1996 | Larsson et al. | 395/616 |
| 5,579,471 A | | 11/1996 | Barber et al. | 395/326 |
| 5,586,197 A | | 12/1996 | Tsujimura et al. | 382/162 |
| 5,621,821 A | | 4/1997 | Pearman et al. | 382/254 |
| 5,664,080 A | | 9/1997 | Lucas et al. | 345/431 |
| 5,687,239 A | | 11/1997 | Inanaga et al. | 381/25 |
| 5,704,013 A | | 12/1997 | Watari et al. | 395/23 |
| 5,729,471 A | | 3/1998 | Jain et al. | 364/514 A |
| 5,734,747 A | | 3/1998 | Vaidyanathan | 382/170 |
| 5,745,126 A | | 4/1998 | Jain et al. | 345/952 |
| 5,751,286 A | | 5/1998 | Barber et al. | 345/348 |
| 5,767,893 A | | 6/1998 | Chen et al. | 348/7 |
| 5,777,620 A | | 7/1998 | Billyard | 345/426 |
| 5,793,888 A | | 8/1998 | Delanoy | 382/219 |
| 5,794,249 A | | 8/1998 | Orsolini et al. | |
| 5,835,099 A | | 11/1998 | Marimont | 345/431 |
| 5,893,095 A | | 4/1999 | Jain et al. | |
| 5,911,139 A | | 6/1999 | Jain et al. | |
| 5,913,205 A | | 6/1999 | Jain et al. | |
| 5,915,250 A | * | 6/1999 | Jain et al. | 707/100 |
| 5,926,555 A | | 7/1999 | Ort et al. | 382/124 |
| 5,966,434 A | * | 10/1999 | Schafer et al. | 379/201 |
| 5,983,237 A | * | 11/1999 | Jain et al. | 707/104 |
| 5,987,456 A | * | 11/1999 | Ravela et al. | 707/5 |
| 6,016,487 A | | 1/2000 | Rioux et al. | 707/2 |
| 6,016,494 A | * | 1/2000 | Isensee et al. | 707/102 |
| 6,035,055 A | * | 3/2000 | Wang et al. | 382/118 |
| 6,035,057 A | | 3/2000 | Hoffman | 382/159 |
| 6,120,299 A | * | 9/2000 | Trenholm et al. | 434/323 |
| 6,175,829 B1 | * | 1/2001 | Li et al. | 707/3 |
| 6,182,069 B1 | * | 1/2001 | Niblack et al. | 707/6 |
| 6,256,596 B1 | * | 7/2001 | Leite, Jr. et al. | 703/2 |
| 6,269,368 B1 | * | 7/2001 | Diamond | 707/6 |

OTHER PUBLICATIONS

Faloutsos, C., Equitz, W., Flickner, M., Niblack, W., Petkovic, D., and Barber, R., "Efficient and Effective Querying by Image Content," IBM Research Division, Almaden Research Center, pp. 1–27.

Huang, J., Kumar, S. Ravi, Mitra, M., Zhu, W., and Zabih, R., "Image Indexing Using Color Correlograms," Cornell University, pp. 1–7.

Indyk, P., Motwani, R., Raghavan, P., and Vempala, S., "Locality–Preserving hasing in Multidimensional Spaces." In Proceedings of the 29th Annual ACM Symposium on Theory of Computing, pp. 618–625, 1997.

Jacobs, C., Finkelstein, A., and Salesin, D., "Fast Multiresolution Image Querying," Technical Report 95–01–06, Jan. 24, 1995, revised May 20, 1985, 11 pages.

Kanth, K. V. Ravi, Agrawal, Kanth, and Singh, A., "Dimensionality Reduction for Similarity Searching in dynamic Databases," University of California at Santa Barbara, 11 pages.

P. Indyk, R. Motwani, P. Raghavan, and S. Vempala, "Locality–Preserving Hashing in Multidimensional Spaces." In Proceedings of the 29th Annual ACM Symposium on Theory of Computing, pp. 618–625, 1997.

C. Jacobs, A. Finkelstein, D. Salesin, "Fast Multiresolution Image Querying," Technical Report 95–01–06, Jan. 24, 1995, Revised May 20, 1995.

C. Faloutsos, W. Equitz, M. Flickner, W. Niblack, D. Petkovic, R. Barber, "Efficient and Effective Querying by Image Content."

K. V. Ravi Kanth, D. Agrawal, A. Singh, "Dimensionality Reduction for Similarity Searching in Dynamic Databases."

J. Huang, S. Ravi Kumar, M. Mitra, W. Zhu, R. Zabih, "Image Indexing Using Color Correlograms."

M. Berry, S. Dumais, T. Letsche, "Computational Methods for Intelligent Information Access."

Bach, Jeffrey R., et al.; The Virage Image Search Engine: An open framework for image management; Virage, Inc.; http//www.virage.com; published Jan. 2, 1996; SPIE vol. 2670; pp. 76–87.

Lemstrom, Kjell, et al.; PICSearch–A Platoform for Image Content–based Searching Algorithms; The Sixth Int. Conf. in Central Europe on Computer Graphics and Visualation, Plzen, 1998.; published Feb. 3, 1998; pp. 222–229.

Orphanoudakis, S.C., et al.; $I^2C$: A System for the Indexing, Storage, and Retrieval of Medical Images by Content; Institute of Computer Science, Foundation for Research and Technology–Hellas and Department of Computer Science, University of Crete, Heraklion, Crete, Greece; Jan. 1994; published Sep. 30, 1993; pp. 1–18.

Ubell, Michael, et al.; Embedding image query operations in an object–relational database management system; Illustra Information Technologies, Inc.; SPIE vol. 2420; published 1995; pp. 197–203.

PCT Search Report for PCT/US 99/24094 mailed Apr. 4, 2000; 4 pages.

Magnifi Application Server; Overview; Magnifi Products; pp. 1–4.

Oracle8™ Image Data Cartridges; Features Overview; Jun. 1997; pp. 1–5,1–8.

VIR Image Engine; Products & Technologies; Virage, Inc.; 1998; pp. 1, 1–3.

Binaghi, Elisabetta et al.; Indexing and Fuzzy Logic–Based Retrieval of Color Images; Proceedings of the IFIP TC2/WG2.6 Second Working Conference on Visual Data Base Systems; Budapest, Hungary, Sep. 30–Oct. 3, 1991; edited by E. Knuth and L.M. Wegner; Elsevier Science Publishers B.V.; 1992; pp. 79–92.

Swain, Michael J. et al.; Color Indexing; International Journal of Computer Vision; vol. 7; No. 1; 1991; Kluwer Academic Publishers; pp. 11–32.

Tamura, Hideyuki et al.; Textural Features Corresponding to Visual Perception; IEEE Transactions on Systems, Man, and Cybernetics; vol. SMC–8; No. 6; Jun. 1978; pp. 460–472.

* cited by examiner

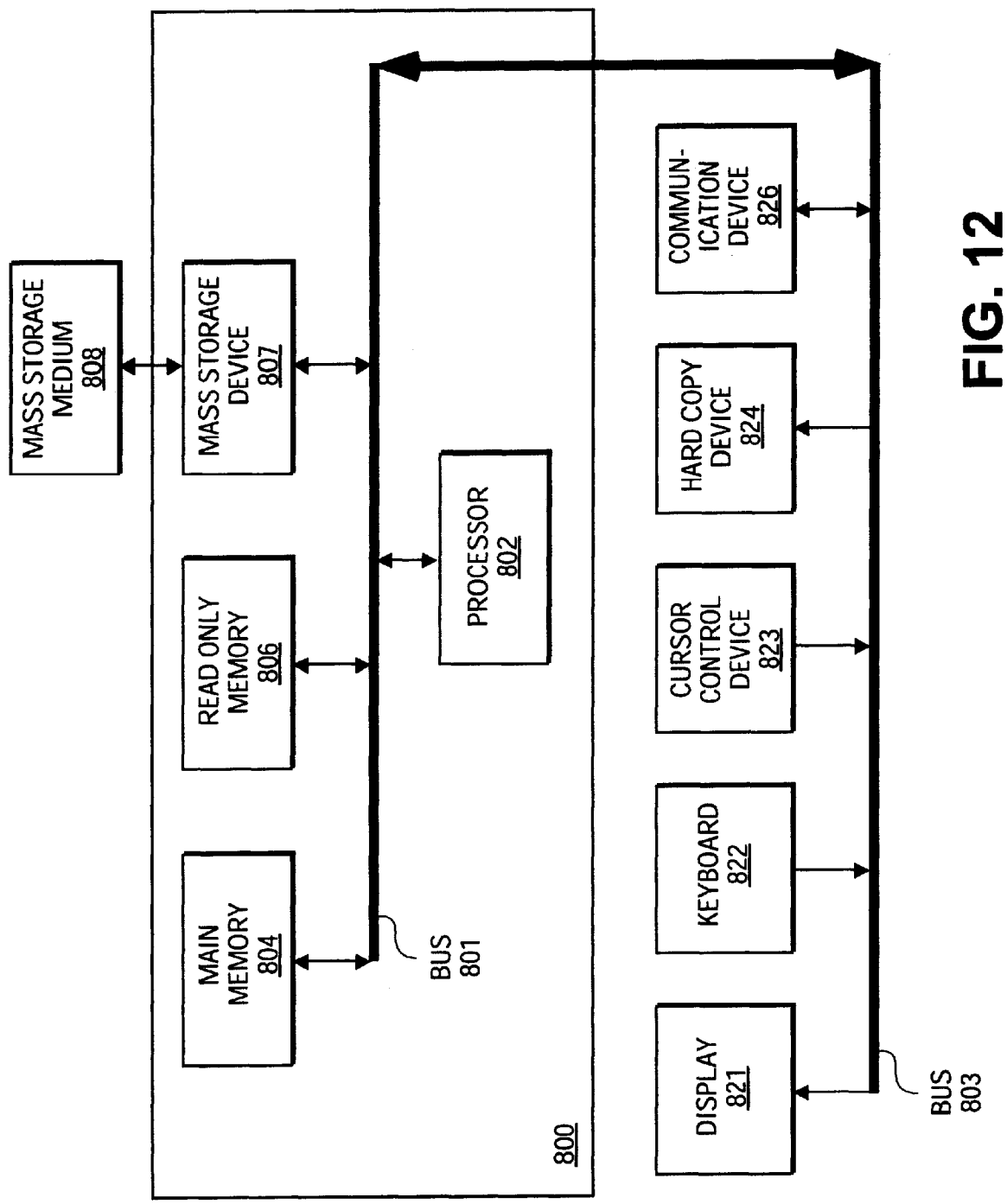

MODULAR IMAGE QUERY SYSTEM

RELATED APPLICATIONS

This application is related to co-pending applications having Ser. No. 09/175,146 filed on Oct. 19, 1998 and Ser. No. 09/176,612 filed on Oct. 21, 1998.

FIELD OF THE INVENTION

The present invention relates to computer-based systems which provide analysis and query by image content.

DESCRIPTION OF RELATED ART

Conventional computer systems have been employed to analyze visual images. These visual images include, for example, photographic stills, digitally rendered graphics, video clips, and any other monochrome or color images suitable for representation in a digital system. One goal of these image analysis or image processing systems is to generate information about the characteristics of an image so the image can be classified or used to query an image database.

Conventional image processing techniques include many methods for extracting characteristics or features from an image. For example, techniques are known for extracting color, texture, and component shape characteristics of a given image. The prior art techniques for extracting the color features of an image typically employ one of two methods. First, the user may select a desired color, which is used as the basis for an image color query. Images are matched to the selected color based on the average color of the matched image over the entirety of the image. A second prior art image color analysis technique determines not only the overall color of a desired image, but also the percentage coverage of that color and the compactness of its coverage in a desired image. The percentage color coverage and color compactness are used as additional query conditions in these prior art systems. An example of these conventional techniques is given in E. Binaghi, et al, "Indexing and Fuzzy Logic-Based Retrieval of Color Images", Visual Database Systems, II. IFIP Transactions A-7, pp. 79–92, Elsevier Science Publishers, 1992.

Other prior art image analysis techniques are known for extracting texture features of an image. Texture features such as granularity, directionality, and tiling features of a given image can be extracted using known techniques. One example of such techniques is found in H. Tamura, et al, "Textural Features Corresponding to Visual Perception", EEE Proceedings, Vol. SMC-8, No. 6, June 1978, pp. 460–473.

Still other techniques are known in the prior art for classifying an image based on structure features, which represent shapes found in the image. Using these known techniques, predefined shapes, such as rectangular, triangular, or circular shapes among others, may be compared to an image to determine the presence of such shapes in the image. This known technique may be used to query an image database for images having a particular specified shape. One example of a prior art method for image analysis based on shapes is found in G. Taubin and D. B. Cooper, "Recognition and Positioning of Rigid Objects Using Algebraic Moment Invariants", Geometric Methods in Computer Vision, SPIE, Vol. 1570, pp. 175–186, 1992.

Other prior art systems have sought to combine a plurality of image color analysis techniques into a single system. For example, U.S. Pat. No. 5,751,286 describes an image query system and method wherein the visual characteristics of an image such as color, texture, shape, and size are used to develop an image query. The technique described in this patent involves selecting from a plurality of image characteristic selections represented by thumbnail icons corresponding to various image characteristics for a particular image query. As shown in the '286 patent, these image characteristic (feature) selections are submitted to a query by image content (QBIC) engine, which compares the various image characteristic selections with a database of stored images. Although the '286 patent describes the technique for processing various types of image characteristics, the described centralized QBIC engine must be capable of handling all of the supported types of image feature processing. As will be discussed in more detail below, the fully supportive QBIC engine has a number of significant drawbacks.

As evident from the prior art describing image-processing techniques, image analysis and image query systems demand a high degree of processing power. In fact, processing even one of the various types of image characteristics, such as color or texture, involves many processor cycles and data storage accesses. An image query system, such as the one described in the '286 patent, that supports a plurality of image characteristic analysis methods must therefore be a very complex and expensive system to implement. On the other hand, images for a particular application of such a system may be more appropriately analyzed by a particular image characteristic analysis method and much less efficiently analyzed using other image characteristic analysis methods. Thus, it would be advantageous to enable the configuration of an image query system for a particular application. Unfortunately, the prior art, as represented by the techniques illustrated in the '286 patent, do not enable such a specific configuration given that the QBIC engine is built to handle a full range of image analysis techniques. One problem with this approach is that a user is forced to purchase or program a full-service system even though many of the supported techniques may be underutilized. Further, the system cannot be easily augmented if a new image analysis technique is developed.

It would be advantageous to implement an image query system that is configurable for a particular application. Specifically, it would be advantageous to provide an image query system that supported image analysis techniques most appropriate for the types of images encountered in a particular application. Such a configurable image query system should be modular and extensible so that a user need only purchase or program those image analysis methods most appropriate for the particular application and so new image analysis methods may be easily incorporated into an existing system. The prior art does not disclose such a system.

Some conventional products purport to provide image analysis modularity. Oracle Corporation of Redwood Shores, California developed the image data cartridge component of the Oracle 8 Database. The Oracle 8 image data cartridges object interfaces associate specific data with procedures that can operate on that data. The image procedures provide the means by which the images can be copied, format converted, and processed on demand. In reality, the Oracle 8 image data cartridges merely support various image and graphic file formats rather than supporting a variety of image content analysis techniques.

Thus, a configurable modular image query system supporting modular feature extraction components and modular scoring components is needed.

SUMMARY OF THE INVENTION

An image query and storage apparatus and method including a plurality of dynamically linkable feature modules is disclosed. Each of the plurality of feature modules extract a different set of feature information from an input image. The method and apparatus further includes a database coupled to the plurality of feature modules. The database includes storage for the different set of feature information for each of the plurality of feature modules. The method and apparatus support a query by image content of the database of images using the dynamically linked plurality of feature modules. The method and apparatus further includes a plurality of dynamically linkable scoring modules for processing feature specific scoring information generated by the feature modules.

BRIEF DESCRIPTION OF THE DRAWINGS

The features and advantages of the present invention will be apparent in the drawings identified below followed by the detailed description of the preferred embodiment.

FIG. 12 illustrates a conventional computer system upon which the present invention may be implemented.

DETAILED DESCRIPTION OF THE PREFERRED EMBODIMENTS

The present invention is a method and apparatus for enabling configurable and modular image query. In the following description, for purposes of explanation, numerous specific details are set forth in order to provide a thorough understanding of the present invention. It will be evident, however, to one of ordinary skill in the art that the present invention may be practiced without these specific details. In other circumstances, well-known structures and devices, and interfaces are shown in block diagram form in order to avoid unnecessarily obscuring the present invention.

The present invention is a modular, configurable, and extendable image storage and query system. The invention has the advantage of a modular architecture enabling dynamic installation of modules for performing specific types of feature analysis and scoring on a particular image or database of images. The basic architecture of the present invention is illustrated in FIG. 1.

Figure 1:
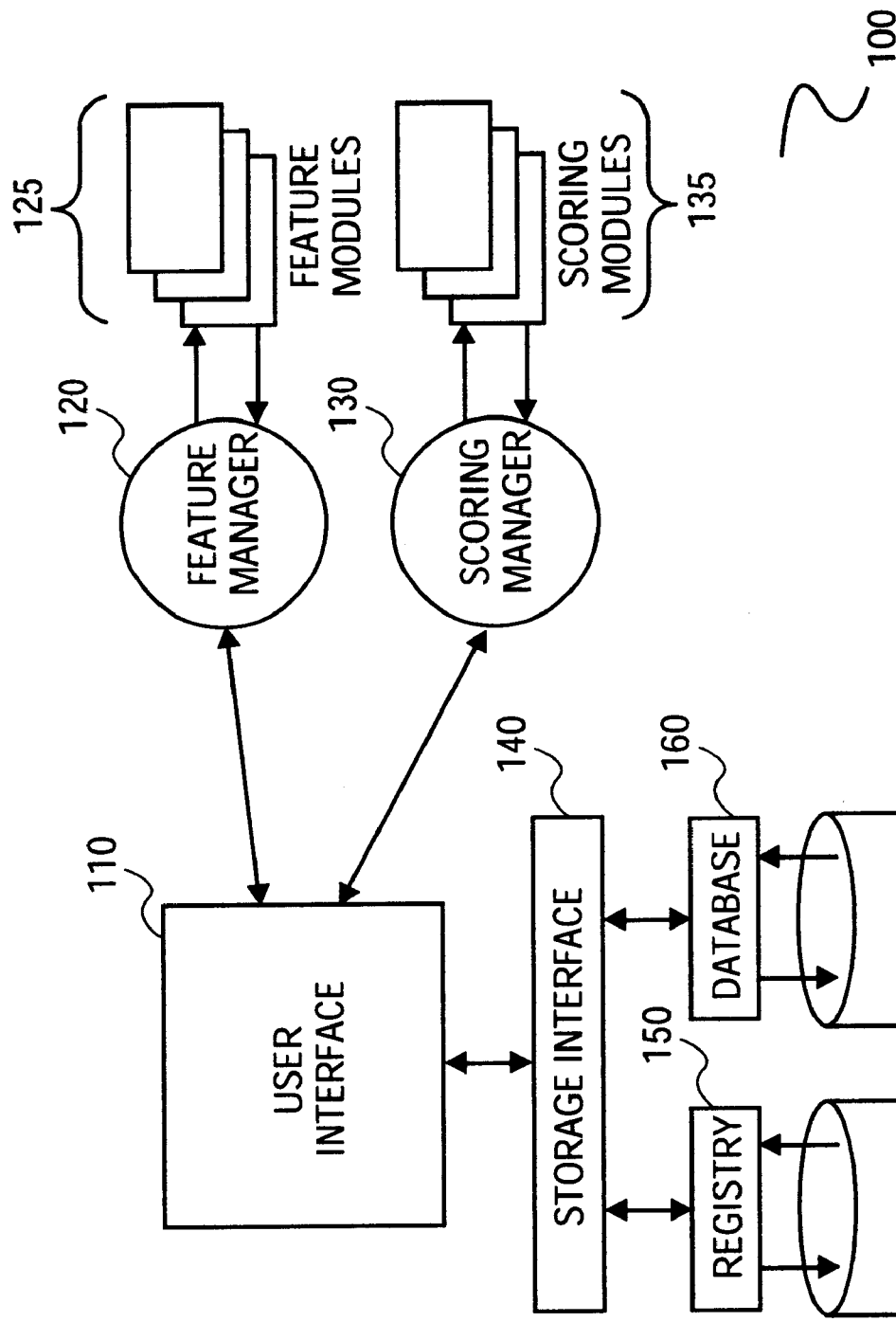
FIG. 1 illustrates the software architecture of the present invention.

Referring to FIG. 1, the software architecture of the present invention is illustrated. Each of the software components of the present invention illustrated in FIG. 1 can be implemented on a conventional computer system such as the sample system illustrated in FIG. 12 and described below. User interface component 110 represents software for interfacing with a human user. Using conventional methods, user interface 110 displays various windows, menus, icons, and controls other conventional user input and output functions. User interface 110 provides a means by which a user may provide image input and system configuration selection information input to the modular image storage and query system 100 of the present invention. In general, image input to system 100 includes user-identified images digitized and formatted in conventional ways. For example, the present invention can process images in a bit-mapped format commonly identified by the file name extension ".bmp". It will be apparent to those of ordinary skill in the art that other image file formats may similarly be supported.

At its most basic level, system 100 receives images and image queries through user interface 110. The images are each analyzed by feature manager 120 using a plurality of dynamically linked feature modules 125. Feature manager 120 uses the feature modules 125 to analyze an input image and to extract a set of image characteristics represented by a plurality of feature descriptors. The feature descriptors for each input image are transferred by feature manager 120 through user interface 110 and storage interface 140 into database 160 for permanent storage. System 100 also allows a user to run a query by image content against the set of images in database 160 represented by feature descriptors. As input to an image query, a user provides an input image through user interface 110. The feature manager 120 invokes feature modules 125 to analyze the characteristics of the input image. Again, the feature manager 120 produces a set of feature descriptors for the input image. Once the input image has been analyzed, the feature descriptors for the input image are compared with feature descriptors from the database 160 of stored image data. Feature manager 120 produces a set of scoring data based on the comparison of the input image feature descriptors with the database-resident feature descriptors. This scoring information is passed to scoring manager 130 which uses a set of dynamically linked scoring modules 135 to process the scoring information. As a result of this scoring processing, scoring manager 130 produces a set of sorted images most closely corresponding to the input image based on the pre-configured set of feature modules 125 and scoring modules 135. This set of sorted images corresponding to the input image may then be displayed to user via user interface 110. The processes of the present invention for adding an image to database 160, for querying an image by its content, and for registering a feature module or scoring module are described in more detail below.

Again referring to FIG. 1, user interface 110 communicates with database 160 and a registry 150 through a storage interface 140. Storage interface 140 provides a means for abstracting the implementation detail of registry 150 and database 160 from user interface 110. In this manner, a variety of different database implementations may be used without impacting the user interface 110 implementation. In the preferred embodiment of the present invention, a registry 150 is used for storage of system configuration information and pointers to feature modules 125, scoring modules 135, and image data in database 160. Database 160 is used for the storage of feature descriptors for each image added to system 100. Further details of the structure of registry 150 and database 160 are provided below.

Figure 2:
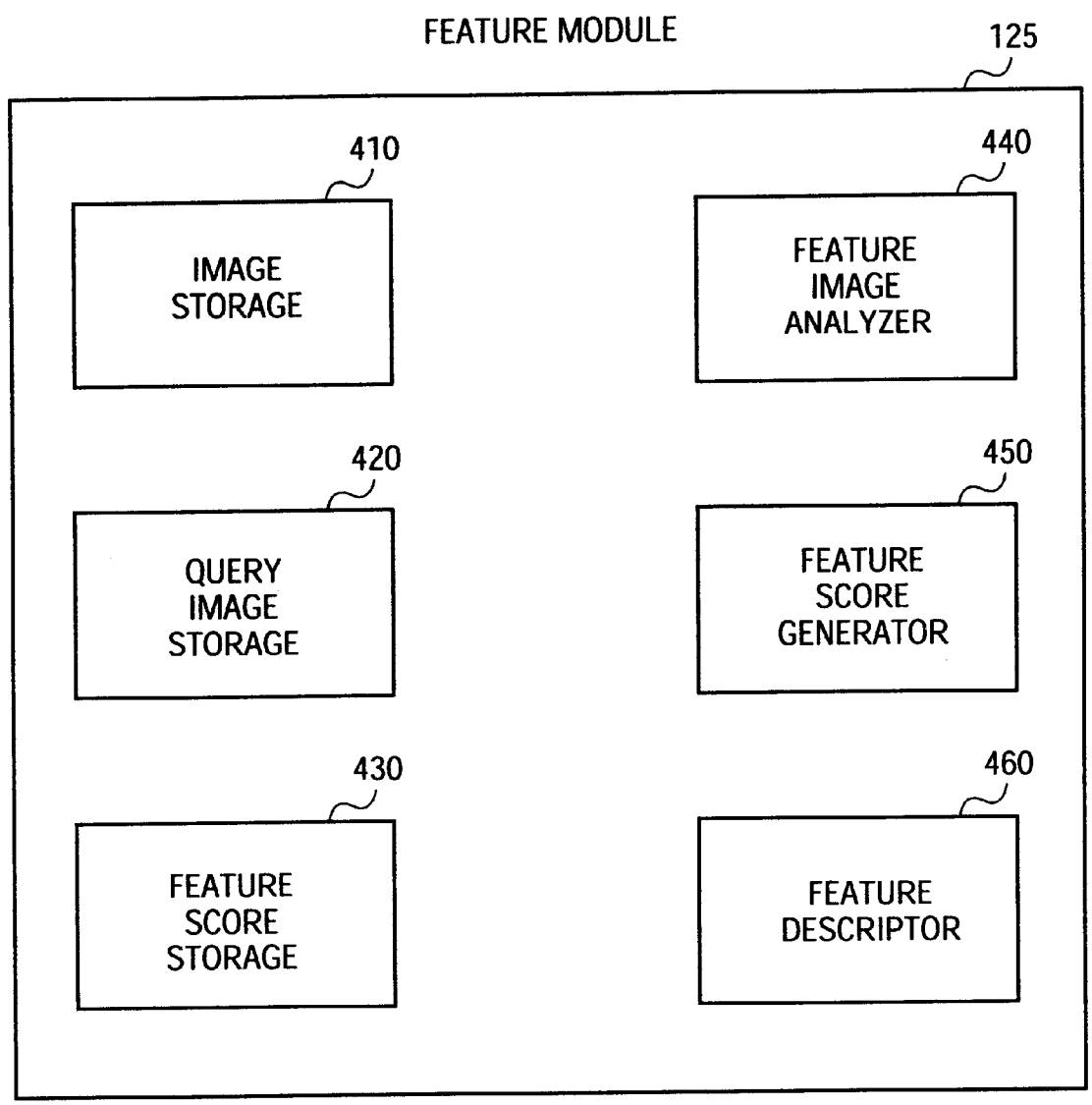
FIG. 2 illustrates the components of a feature module.

Referring now to FIG. 2, a more detailed diagram illustrates the components present in each of the feature modules 125. Each feature module is responsible for performing all of the processing necessary for analyzing an input image for a particular characteristic or feature. Such particular features include color, texture, or wavelet response. As indicated in the background section of this patent application, conventional techniques exist for analyzing an image to extract particular features such as color or texture and to produce information that describes the particular characteristics of the image. a In general, feature modules 125 perform all of the processing necessary for analyzing an input image for a particular characteristic. Because all of the feature specific knowledge is retained by the particular feature module 125, the rest of system 100 does not need to be designed with a specific feature analysis method or set of feature analysis methods in mind. By isolating feature specific information into feature modules 125, the present invention can be configured to operate with a variety of different configurations of feature modules 125. In the preferred embodiment, the feature modules 125 are implemented as dynamic link library (DLL) components, which can be dynamically linked to the system 100 using conventional methods. Although each of the features modules 125 are designed to extract a particular image feature, each of feature modules 125 contain a common set of components as illustrated in FIG. 2.

Referring now to FIG. 2, the common components included in each of the feature modules 125 is illustrated. Feature modules 125 include an image storage area 410 for storing an image being added to database 160 or an input image upon which an image query will be run. Feature modules 125 also include a query image storage area 420. Area 420 is used for storing images from database 160 which are to be compared with an input image stored in area 410. Feature score storage 430 is used for storage of score information compiled by the feature module during an image query. Feature image analyzer 440 represents a software component or programming code module comprising processing logic for extracting particular image characteristics from an input image and for generating a feature descriptor representing the extracted features. Feature score generator 450 represents a software component or programming code module containing processing logic for generating feature specific scoring information during an image query. This feature specific scoring information is stored in area 430. Feature descriptor 460 is a storage area used by the feature image analyzer 440 for the storage of a feature descriptor generated by the feature module from an input image. The feature descriptor 460 will have a different format depending on the type of feature being extracted from the image and the type of feature extraction methodology used by the particular feature module. One such sample format of a feature descriptor 460 is illustrated in FIG. 3.

Figure 3:
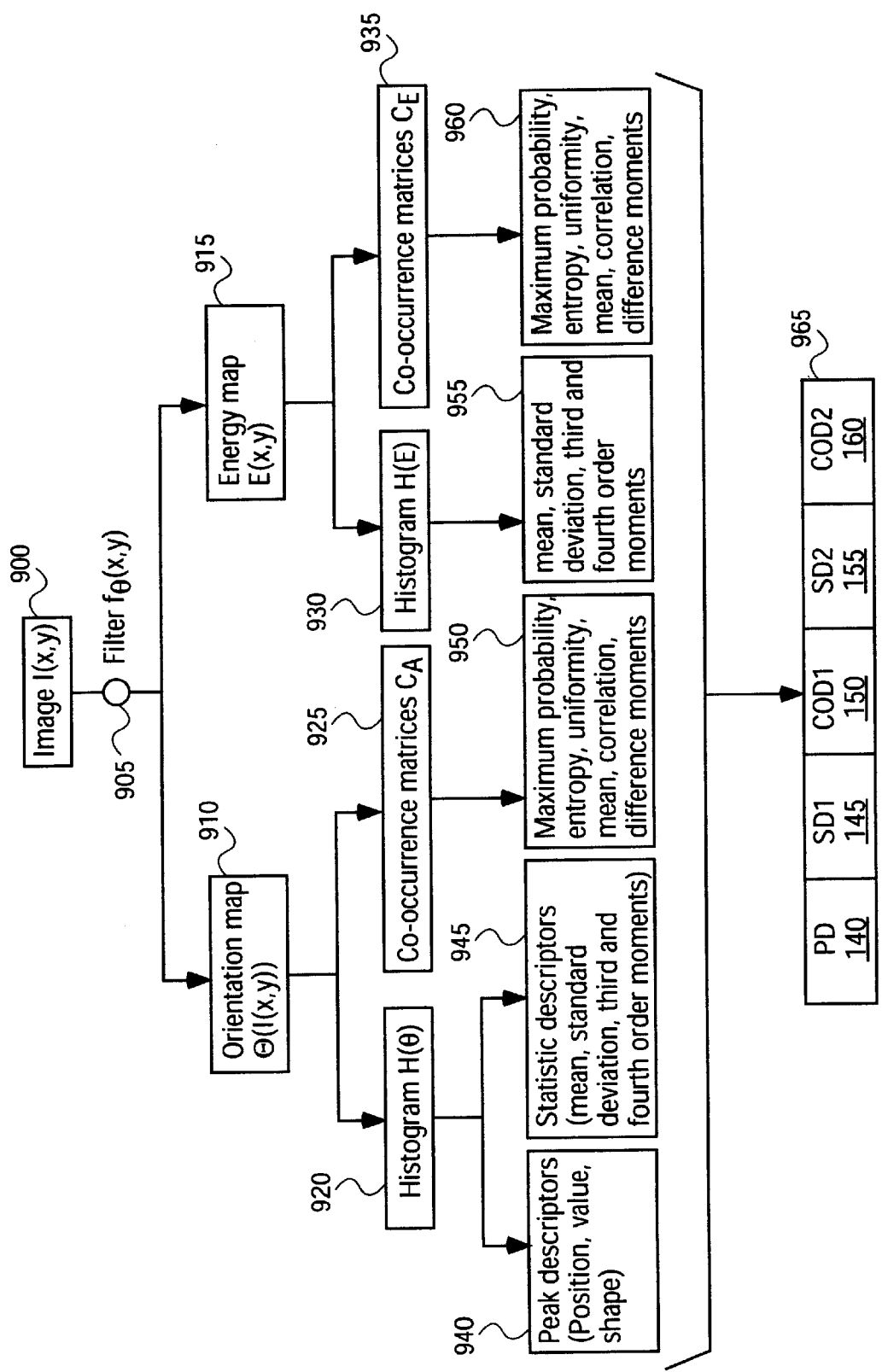
FIG. 3 illustrates the components of a feature descriptor.

Referring now to FIG. 3, an example of a feature descriptor format and a feature extraction methodology is illustrated. FIG. 3 illustrates an embodiment of a structure and method for generating a multi-element feature descriptor, which is capable of implementing the teachings of the present invention. Particularly, FIG. 3 illustrates, in block flow diagram format, a method of generating a feature descriptor which is representative of a multi-band image for use in image processing.

Image features extracted from the output of spatial filters are often used for image representation. The application of multi-band images to spatial filters enables the construction of feature sets which contain a wide range of spectral and spatial properties. One such type of oriented spatial filter is the steerable filter. Steerable filters obtain information about the response of a filter at any orientation using a small set of basis filters. In one embodiment, $$x^2 \exp\left(-\frac{x^2+y^2}{2*\sigma^2}\right)$$

is chosen as the kernel of the steerable filter. Accordingly, for this kernel of information, a steerable filter at an arbitrary orientation θ can be synthesized using a linear combination of three basis filters according to $h^\theta(x,y)=k_1(\theta)h^0(x,y)+k_2(\theta)h^{60}(x,y)+k_3(\theta)h^{120}(x,y)$, where $$h^0(x,y) = x^2 \exp\left(-\frac{x^2+y^2}{2*\sigma^2}\right),$$

$$h^{60}(x,y) = \left(\frac{1}{2}x + \frac{\sqrt{3}}{2}y\right)^2 \exp\left(-\frac{x^2+y^2}{2*\sigma^2}\right),$$

$$h^{120}(x,y) = \left(-\frac{1}{2}x + \frac{\sqrt{3}}{2}y\right)^2 \exp\left(-\frac{x^2+y^2}{2*\sigma^2}\right)$$

and $k_1(\theta)=1+2\cos 2\theta$ $k_2(\theta)=1-\cos 2\theta+\sqrt{3}\sin 2\theta$ $k_3(\theta)=1=\cos 2\theta-\sqrt{3}\sin 2\theta$.

As illustrated in the embodiment of FIG. 3, an image [I(x,y)] 900 is applied to the steerable filter [Filter f θ (x,y)] 905 which provides two different matrices for each image, an orientation matrix 110 and an energy matrix 915. The orientation matrix 110, also referred to as an Orientation Map Θ (I(x,y)) 910, is derived by computing the dominant orientation at each pixel position (x,y) by using the equation:

$$\theta(x,y) = \frac{1}{2}\arctan\left(\frac{\sqrt{3}\,(E(60°)(x,y) - E(120°)(x,y))}{2E(0°) - E(60°) - E(120°)}\right).$$

Whereas, the energy matrix 915, also referred to as an Energy Map E (I(x,y)) 915, corresponds to the dominant orientation at each pixel position (x,y) in accordance with the equation:

$E(x,y)=E(0°)+E(60°)+E(120°)+2$
$\sqrt{E^2(0°)+E^2(60°)+E^2(120°)-E(0°)(E(60°)+E(120°))-E(60°)E(120°)}$ Accordingly, for each matrix or map, the Orientation Map Θ (I(x,y)) 910 and the Energy Map E (I(x,y)) 915, a corresponding histogram or set of histograms is used to represent global information, along with a set of co-occurence matrices which are used to represent local information. As such, the Orientation Map Θ (I(x,y)) 910 is represented as a corresponding orientation histogram H(θ) 920 and set of orientation co-occurence matrices CΘ 925. Similarly, the Energy Map E (I(x,y)) 915 is represented as a corresponding energy histogram H(E) 930 and set of energy co-occurence matrices CE 935. Therefore, each image 900 is represented by a corresponding orientation histogram H(θ) 920, a set of orientation co-occurence matrices CΘ 925, a corresponding energy histogram H(E) 930, and a set of energy co-occurence matrices CE 935.

Next, a series of descriptors are extracted from each of the corresponding histograms and co-occurence matrices.

The descriptors extracted from the orientation histogram H(θ) 920 of the Orientation Map Θ (I(x,y)) 910 are peak descriptors (PD) 940 and statistic descriptors (SD1) 945. The peak descriptors (PD) 940 comprise position, value, and shape data associated with the orientation histogram H(θ) 920. The statistic descriptors (SD1) 945 indicate mean, standard deviation, third and fourth order moments associated with the orientation histogram H(θ) 920. Select elements within the peak descriptors (PD) 940 are used to classify images into different categories, whereas the statistic descriptors (SD1) 945 are used to describe the shape of the orientation histogram H(θ) 920.

The descriptors extracted from the orientation co-occurence matrices CΘ 925 of the Orientation Map Θ (I(x,y)) 910 are co-occurence descriptors (CODI) 950. The co-occurence descriptors (COD1) 950 comprise maximum probability, entropy, uniformity, mean, correlation, and difference moments. The co-occurence descriptors (COD1) 950 in the present embodiment are computed in four different orientations (−45 Degrees, 0 Degrees, 45 Degrees, and 90 Degrees).

Correspondingly, the descriptors extracted from the energy histogram H(E) 930 of the Energy Map E (I(x,y)) 915 are statistic descriptors (SD2) 955. The statistic descriptors (SD2) 955 indicate mean, standard deviation, third and fourth order moments associated with the energy histogram H(E) 930. The statistic descriptors (SD2) 955 associated with the energy histogram H(E) 930 are used to describe the shape of the orientation energy histogram H(E) 930.

Likewise, the descriptors extracted from the energy co-occurence matrices CE 935 of the Energy Map E (I(x,y)) 915 are co-occurence descriptors (COD2) 960. The co-occurence descriptors (COD2) 960 comprise maximum probability, entropy, uniformity, mean, correlation, and difference moments. The co-occurence descriptors (COD2) 960 in the present embodiment are computed in four different orientations (−45 Degrees, 0 Degrees, 45 Degrees, and 90 Degrees).

Each of the descriptors associated with an image is combined in order to form a feature vector or feature descriptor 965. As such, in this example, each individual descriptor 970 associated with an image comprises peak descriptors (PD) 940, statistic descriptors (SD1) 945, co-occurence descriptors (COD1) 950, statistic descriptors (SD2) 955, and co-occurence descriptors (COD2) 960, which are combined to form a feature descriptor 965. As such, the feature descriptor 965 is a full representation of each image which may be used for image processing. For multi-band applications, a feature descriptor 965 is generated for each information band comprising the multi-band image, as such, each information band associated with each multi-band image has a corresponding feature descriptor 965. For instance, a multi-band image using the RGB color spectrum would have an individual feature descriptor 965 for each information band or color band (RGB) of the multi-band image.

Figure 4:
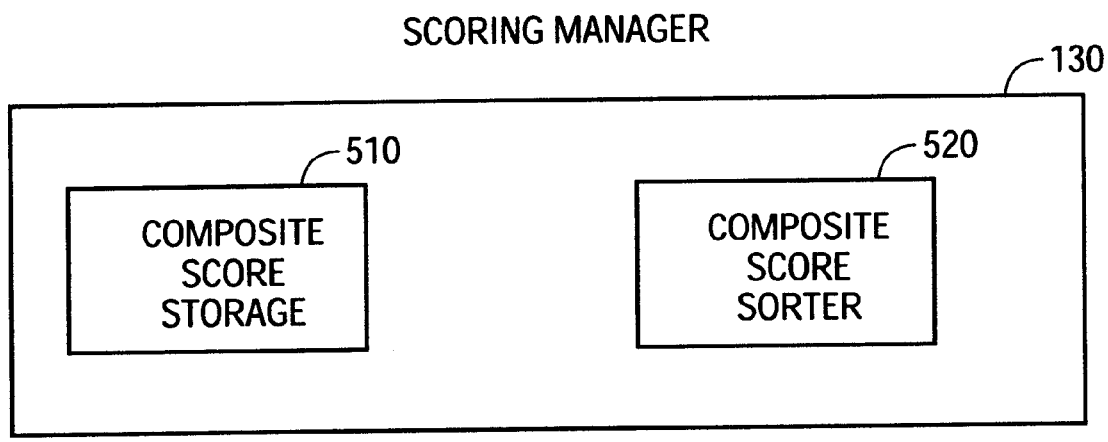
FIG. 4 illustrates the components of the scoring manager.

Referring now to FIG. 4, the basic components of scoring manager 130 are illustrated. Scoring manager 130 is responsible for receiving a set of scoring information corresponding to scores generated for each individual image by the feature modules 125 and feature manager 120. Because only an individual feature module 125 has the knowledge to process an image for that particular feature, only the feature module 125 can generate a score when that particular feature is compared between two images. Although the feature modules 125 generate scoring information for particular images, the scoring manager 130 in combination with scoring modules 135 must compile this scoring information to produce a composite score for a set of images. In one embodiment of the present invention, the composite score represents a sorting order of a set of query images compared to an input image. The sorting order typically defines the order of the query images from the query images most similar to the input image to the query images least similar to the input image. It will be apparent to those of ordinary skill in the art that many other types of sorting orders or scoring arrangements may equivalently be implemented for a set of image scoring information. As shown in FIG. 4, the composite score storage area 510 is used for the storage of information defining the composite score of a set of images. The composite score sorter 520 represents software or processing logic for generating sorting information which is passed to user interface 110 for sorting the query images for display to the user.

Figure 5:
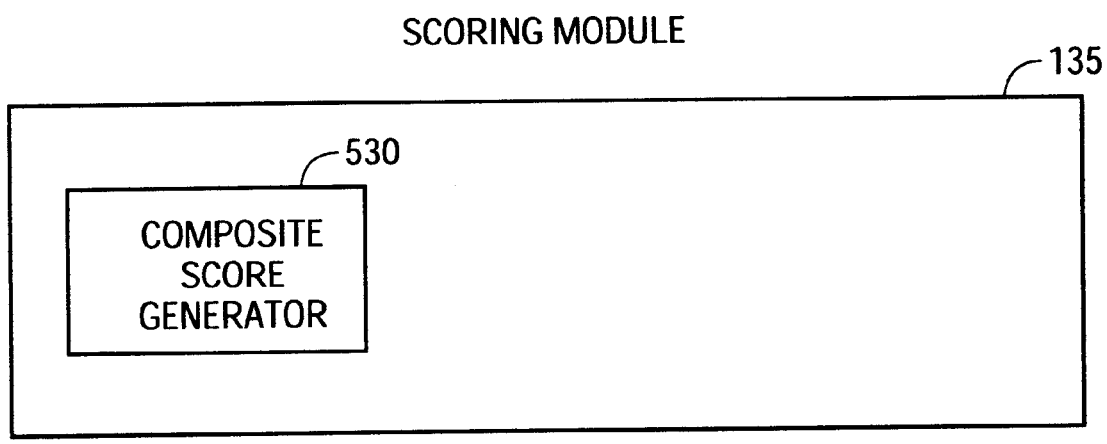
FIG. 5 illustrates the components of a scoring module.

Because there can be many different ways of scoring an image query, the architecture of the present invention provides a means for dynamically linking scoring modules to the system 100 for implementing any one or more of the variety of scoring methods. In general, it is a responsibility of each scoring module 135 to generate a composite score using a particular scoring method. As shown in FIG. 5, each scoring module 135 will therefore include a composite score generator 530 for generating a composite score according to a particular methodology implemented by that particular scoring module 135. One example of a particular scoring methodology is a simple weighted averaging technique for averaging the individual image scores across the entire scoring domain of the image set. In another example of a particular scoring methodology, a three-dimensional space may be generated and the individual image scores may be plotted in this three-dimensional space. The composite score generator 530 may then compute the distance between the input image score location in this three-dimensional space and the location of the score of each query image in the three-dimensional space. It will be apparent to one of ordinary skill in the art that many other scoring techniques may be used and implemented on individual scoring modules 135. In the preferred embodiment, the scoring modules 135 are implemented as dynamic link library (DLL) components, which can be dynamically linked to the system 100 using conventional methods.

Referring again to FIG. 1, user interface 110 connects the feature manager 120 and scoring manager 130 segments to registry 150 and database 160 through storage interface 140. Registry 150 and database 160 are used to store system configuration information and information related to a library of searchable images.

Figure 6:
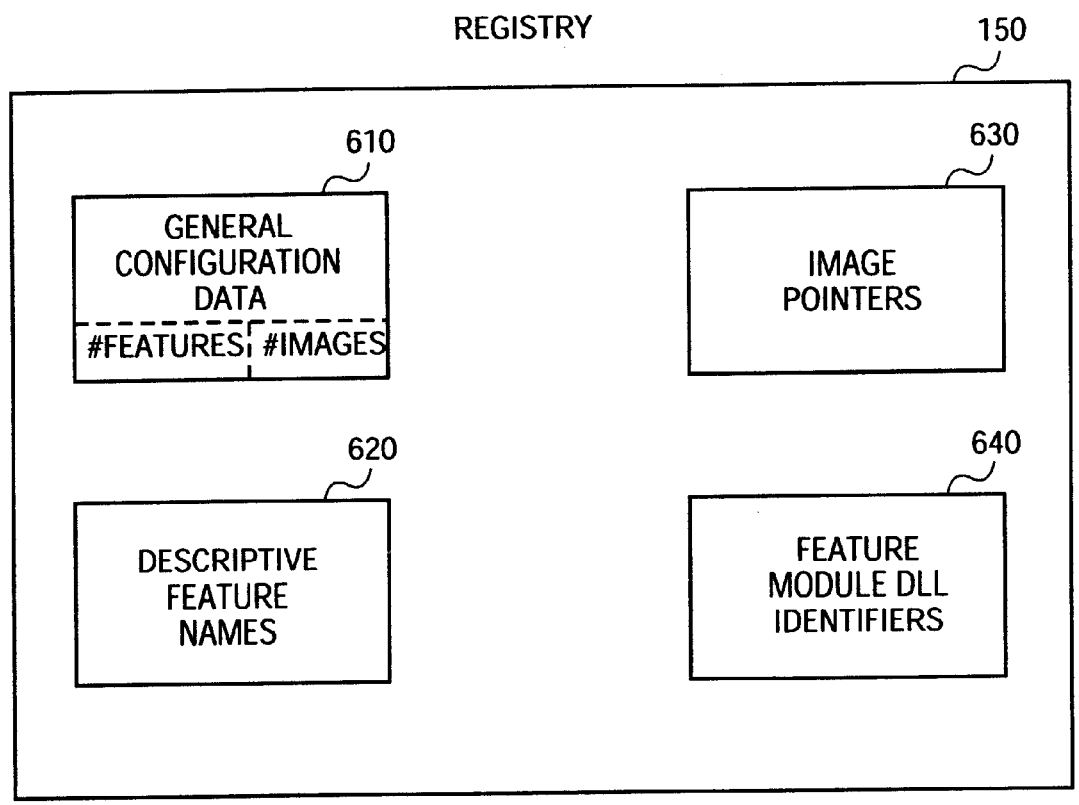
FIG. 6 illustrates the components of the registry.

Referring now to FIG. 6, the main components of registry 150 are illustrated. Registry 150 includes general configuration data 610. Because system 100 can include an arbitrary number of dynamically linked feature modules 125 and scoring modules 135, it is necessary to maintain a current count of the number of these modules installed in a system at a particular time. This information is stored in general configuration data 610. Further, other global information useful for any of the components of system 100, such as the number of images in database 160, are stored in general configuration data 610. It will be apparent to one of ordinary skill in the art that many items of such global information may be stored in the general configuration data 160 of a particular system 100. In general, registry 150 is used for the storage of information for locating and accessing feature modules 125, scoring modules 135, and images in database 160. As shown in FIG. 6, registry 150 includes image pointers 630, which identify the location of each image in database 160. As each image is added to database 160, using a method described in more detail below, a pointer to the image is added to image pointers 630. One other basic function of registry 150 in the preferred embodiment, is the formation of a correspondence between the descriptive name given to a particular feature module and the dynamic link library (DLL) component used to actually implement the feature module. The descriptive feature names 620 are stored in registry 150 along with their corresponding feature module DLL identifiers 640. The descriptive feature names are names of feature extraction methods or image analysis tools displayed to a user for selection through user interface 110. The corresponding feature module DLL identifiers are the DLLs actually invoked when a corresponding descriptive feature name is invoked by the user. In the preferred embodiment of the present invention, the registry 150 is a text file written in the format of a Windows 3.1 .ini file. It will be apparent to those of ordinary skill in the art that other formats for storing registry information in an alternative embodiment may be used.

Figure 7:
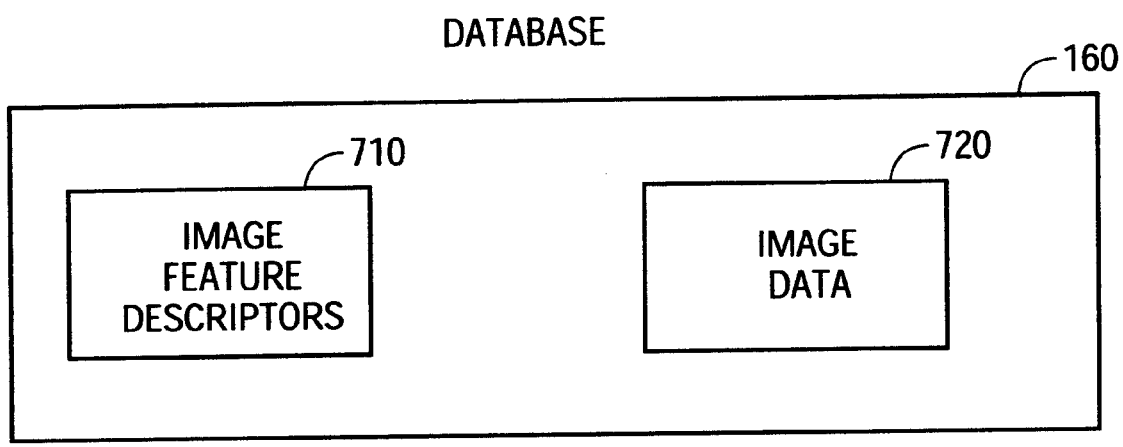
FIG. 7 illustrates the components of the database.
Figure 8:
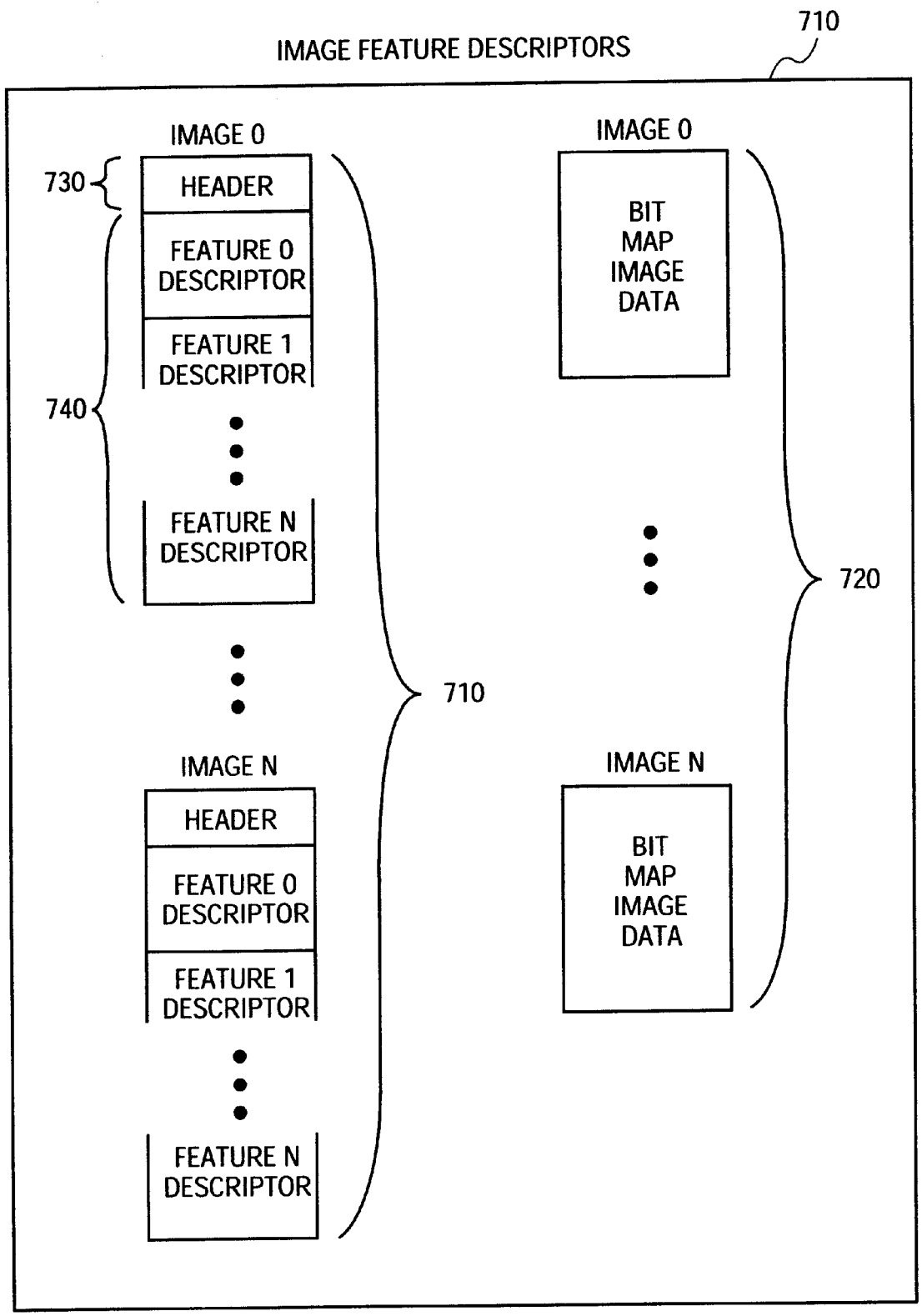
FIG. 8 illustrates the components of the image feature descriptors as stored in the database.

Referring now to FIG. 7, the main component of database 160 is illustrated. Database 160 is used for storage of image feature descriptors 710 for each image as generated by the feature modules 125. Image feature descriptors 710 includes a feature descriptor corresponding to each of the feature modules 125 installed in system 100. The detail of image feature descriptors 710 is illustrated in FIG. 8. As shown in FIG. 8, a plurality of feature descriptors corresponding to the installed feature modules 125, are stored for each image in database 160. The number of feature descriptors for each image varies depending on the number of feature modules 125 currently installed in system 100. A header is maintained for each image to assist in maintaining the linked list of feature descriptors for the image. As the feature descriptors for each image are stored in image feature descriptors 710, the actual image data represented in a bit-mapped form is stored in image data 720. Image data 720 represents the actual bit-mapped image data that may be used to display the image on a display device. In the preferred embodiment, this image data is stored as bit-mapped (.bmp) image data, however it will be apparent to one of ordinary skill in the art that the image data may be represented in any of a variety of conventional image coding techniques. A detail of the image data 720 is illustrated in FIG. 8. A pointer to each bit-mapped image data block is maintained in registry 150. In this manner, the image data for each image in database 160 and the feature descriptors corresponding to the image may be readily located during the process of querying database 160. In the preferred embodiment of the present invention, the database 160 is written in a RIFF format, which is a conventional information format created by IBM Corporation and Microsoft Corporation for manipulation of video and multimedia files.

It will also be apparent to one of ordinary skill in the art that a plurality of databases 160 may be employed in a particular system. Using a plurality of databases 160, a set of images can be partitioned into separate databases and thereby searched more quickly. In support of multiple databases 160, a database identifier for each of the plurality of installed databases 160 is stored in registry 150. In a multiple database 160 configuration, the system must provide a database identifier during the process of adding an image to a database or during the process of querying an image against one or more databases of the system.

Figure 9:
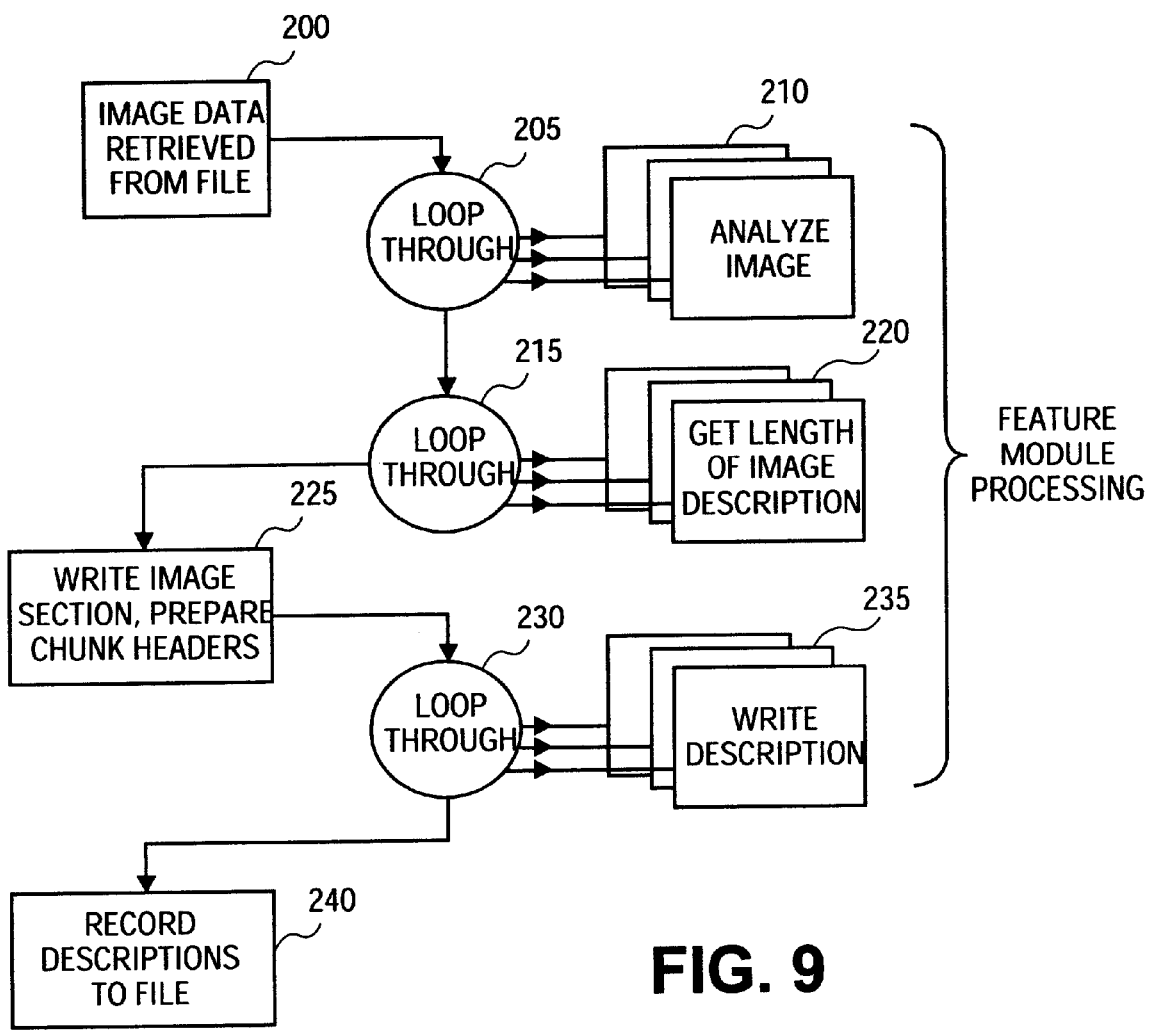
FIG. 9 illustrates the steps performed in the process of adding an image to the database.

Referring now to FIG. 9, the process used in the preferred embodiment of the present invention for adding an image to database 160 is illustrated. In the "add image" process of the present invention, a user provides a new image for entry into database 160 through user interface 110. Initially, the user identifies a data file containing the raw image data of the new image. This image data is retrieved from the identified file in processing block 200 illustrated in FIG. 9. The retrieved image data is passed to feature manager 120. Feature manager 120 begins a loop in which the image data is passed to each of the previously installed feature modules 125. This loop process is illustrated in FIG. 9 at bubble 205 and box 210. By invoking each of the installed feature modules in loop 205, feature manager 120 causes each of the feature modules 125 to produce a corresponding feature descriptor generated as a result of each feature module's analysis of the input image data. Once feature manager 120 has invoked each of the feature modules 125 and a corresponding feature descriptor for each module has been generated, feature manager 120 begins loop 215 illustrated in FIG. 9. As described above, each of the feature modules 125 contain all of the information and processing methods for analyzing an input image for a particular feature. As such, it is possible for the feature descriptor generated by each feature module to be of varying length or content. Also, because the feature specific information is retained in feature modules 125, feature manager 120 cannot know the length or content of the feature descriptor generated by each feature module 125. For this reason, feature manager 120 executes loop 215 to request from each feature module 125 the length of the feature descriptor generated by each feature module (processing blocks 220).

After feature manager 120 has completed loop 215, the image data 720 for the new image is added to database 160 in processing block 225. Using well-known techniques, a data block of an arbitrary size may be requested and obtained from database 160. Once the image data 720 for the new image is written to database 160, the data blocks necessary for storage of the image feature descriptors 710 are prepared. First, the header 730 for the new image is written to database 160. Next, a loop 230 is initiated for writing each of the feature descriptors generated by feature modules 125 to database 160. Because the length of each feature descriptor is known from the processing preformed in blocks 220, the free data blocks of the appropriate length can be obtained from database 160. In loop 230 and processing blocks 235, each of the feature descriptors of the new image are written to the feature descriptor blocks 740 allocated for the new image. As described above, neither the database 160 nor the feature manager 120 are aware of the format or content of the feature descriptor written to feature descriptor blocks 740. Only the particular feature module 125 which generated the particular feature descriptor can decode and interpret the particular feature descriptor stored in database 160. Once each of the feature descriptors are written to database 160, processing block 240 illustrated in FIG. 9 is executed to complete the "add image" process of the preferred embodiment of the present invention. In processing block 240, the registry 150 is updated to reflect the presence of a new image. For example, the general configuration data 610 is updated to advance the number of images counter by one. Additionally, the image pointers 630 are updated to reflect the presence and location of the new image in database 160. It will be apparent to one of ordinary skill in the art that other incidental data may need to be updated to reflect the addition of a new image to database 160. At the completion of this process, the new image and its corresponding feature descriptors are stored in database 160 and available for query by a user.

Figure 10:
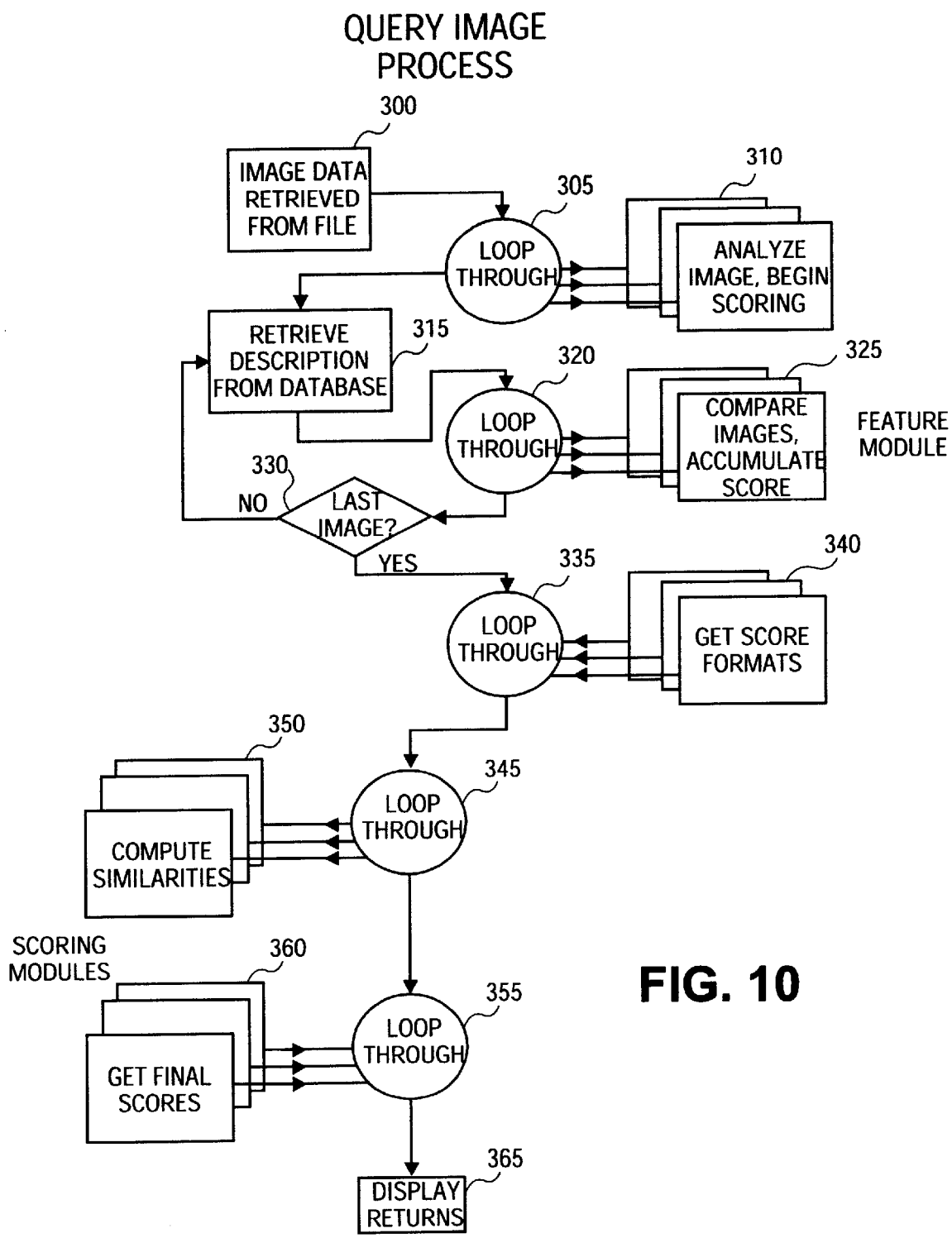
FIG. 10 illustrates the steps performed in the process of querying the image database by image content.

Referring now to FIG. 10, the process used by the present invention for querying an image by content is illustrated. In the present invention, a user may provide or identify to system 100 through user interface 110 an image representing an input image to a query request. In general, system 100 will analyze the features of the input image and then search database 160 for images resident in database 160 (i.e. query images) having features most similar to the input image provided by the user. This query process is described in more detail in FIG. 10. In processing block 300, an input image is identified by a user through user interface 110 and retrieved from the specified location. The input image data is provided by user interface 110 to feature manager 120. Feature manager 120 begins loop 305 in which the input image is sequentially passed to each of the feature modules 125. Each feature module analyzes the input image for each particular feature corresponding to each installed feature module 125 (processing blocks 310). In processing blocks 310, each feature module 125 generates a feature descriptor corresponding to the input image. Once loop 305 has been completed, a set of feature descriptors as generated by each feature module 125 will have been created. This set of feature descriptors for the input image (denoted the input image feature descriptors) represents the feature information which will be compared with corresponding feature information for each of the images in the database (denoted query image feature descriptors). In processing block 315, the query image feature descriptors are retrieved from database 160. In one embodiment of the present invention, the feature descriptors for all of the images resident in database 160 are retrieved for comparison with the input image feature descriptors. In another embodiment of the present invention, the user may specify a subset of the images resident in database 160 for the purpose of restricting the query to a smaller domain of images. For example, a subset of database 160 resident images may be specified using textual descriptive information or other information corresponding to a particular classification of the images within database 160. In another embodiment, a set of query images from multiple databases may be specified. In any case, the query image feature descriptors for a set of images from database 160 that will be used as a query domain are retrieved in processing block 315. It is now necessary to compare the input image feature descriptors to each of the query image feature descriptors. Because only the feature modules 125 can decode and interpret the feature descriptor contents, the input image feature descriptors and the query image feature descriptors must be passed to the corresponding feature module of the set of feature modules 125. Thus, in loop 320, feature manager 120 passes the input image feature descriptors and the query image feature descriptors to each of the feature modules 125. Referring again to FIG. 2, the input image feature descriptors are stored in image storage 410 and the query image feature descriptors are stored in query image storage 420. It will be apparent to one of ordinary skill in the art that these feature descriptors may be stored on each feature module 125 or alternatively stored in a central location, such as within feature manager 120 or in another component for processing by a particular feature module. In processing blocks 325, feature manager 120 invokes each of the feature modules 125 and passes to each feature module the input image feature descriptor and the query image feature descriptor for the corresponding feature module. Each feature module 125 sequentially processes the feature descriptors and compares the input image feature descriptor with the query image feature descriptor. As a result of this comparison, a score is generated by the feature module to indicate the level of similarity or dissimilarity between the input image and the query image. The feature score generator for 50 as shown is FIG. 2 compares the input feature descriptor and the query feature descriptor for the particular feature and generates a score. The score for the particular feature comparison is stored in feature score storage 430 as shown in FIG. 2. Once loop 320 has cycled through each of the feature modules 125, the decision block 330 is executed. In decision block 330, the next query image feature descriptors are retrieved from database 160. If all of the query images have been processed from database 160, processing passes from decision block 330 to loop 335 shown in FIG. 10. If there are still more images in database 160 (or the query domain) to be processed for the query, processing passes from decision block 330 to processing block 315 where the feature descriptors for the next query image are obtained from database 160 and the new query image feature descriptors are processed through each of the feature modules 125 via loop 320.

When each of the query images from database 160 have been compared with the input image for each of the features modules 125 and corresponding scores have been generated, loop 335 is executed. In loop 335, feature manager 120 sequentially cycles through each of the feature modules 125 to obtain the scoring information generated as a result of the feature module's comparison of the input image to each of the query images. In the preferred embodiment, this scoring information is obtained from feature score storage 430 shown in FIG. 2. Once feature manager 120 has obtained scoring information from each of the feature modules 125 (processing blocks 340), processing passes to loop 345 shown in FIG. 10. In loop 345, the scoring information obtained by feature manager 120 from each of the feature modules 125 is passed through user interface 110 to scoring manager 130. It will be apparent to one of ordinary skill in the art that the scoring information in an alternative embodiment may equivalently be passed directly from feature manager 120 to a scoring manager 130. Scoring manager 130 initiates loop 345. In loop 345, scoring manager 130 passes to scoring modules 135 the scoring information generated by each of the feature modules 125 for each of the query images from database 160. Using this information, scoring modules 135 compute the similarities between the input image and each of the query images (processing blocks 350). Because a variety of different scoring techniques may be used for a particular implementation, it is convenient to provide modular, and dynamically linkable scoring modules 135 which can each implement one of the variety of scoring techniques. Each of these installed scoring techniques as implemented on scoring modules 135 are invoked by scoring manager 130 sequentially as loop 345 is executed. The scoring modules 135 generate the similarities in scoring information between the input image and each of the query images (processing blocks 350). Once the similarities between the input image and the query images is generated in processing blocks 350, scoring manager 130 enters loop 355 where each of the scoring modules 135 are again invoked sequentially to compute the final scores which rank the query images in an order corresponding to their similarity to the input image (processing blocks 360). Having ordered the query images according to their similarity with the input image, the most similar images may then be displayed to the user through user interface 110 at processing block 365.

Figure 11:
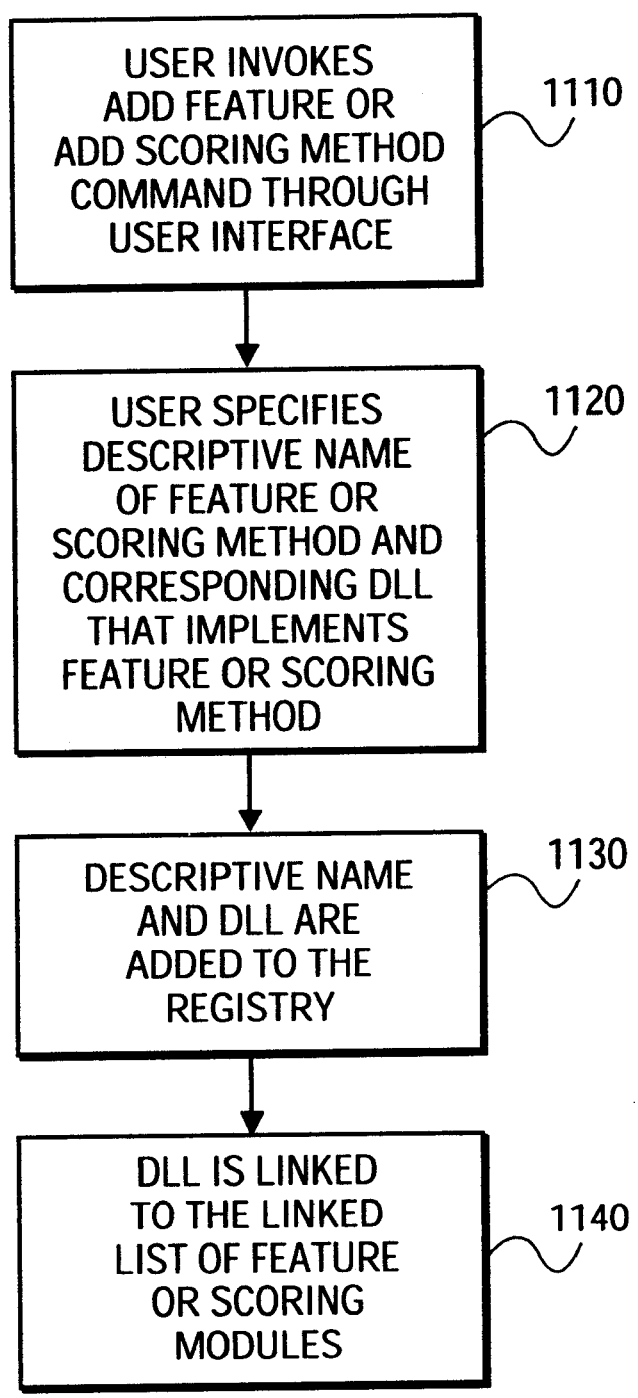
FIG. 11 illustrates the steps performed in the process of registering a feature module or scoring module.

Referring now to FIG. 11, the steps performed in the present invention for registering a feature module or scoring module are illustrated. In processing block 1110, the user invokes an "Add Feature" or an "Add Scoring Method" command through user interface 110. This command directs the user through a series of dialog boxes and input screens to obtain the information necessary for registering the new feature module or scoring module. In processing block 1120, the user specifies a descriptive name of a particular feature or feature extraction method. The user also specifies a descriptive name corresponding to the scoring method to be added to system 100. The descriptive names of the new feature or scoring method are displayed in various user interface 110 menus or information windows. A dynamic link library (DLL) module corresponding to the descriptive name of the feature or scoring method is also provided by the user in processing block 1120. The DLL corresponds to the executable software necessary for implementing the feature extraction method or scoring method. The user specifies the location of the DLL, typically by specifying the path or file name corresponding to the DLL in a particular file system. The user-entered descriptive name and DLL identifier is added to the registry 150 in processing block 1130. Finally, the user specified DLL is linked to the linked list of feature modules or scoring modules in processing block 1140. In this manner, a feature module 125 or scoring module 135 may be dynamically linked with system 100 and thereafter be employed for analyzing input images.

FIG. 12 illustrates a typical data processing system upon which one embodiment of the present invention is implemented. It will be apparent to those of ordinary skill in the art, however that other alternative systems of various system architectures may also be used. The data processing system illustrated in FIG. 12 includes a bus or other internal communication means 801 for communicating information, and a processor 802 coupled to the bus 801 for processing information. The system further comprises a random access memory (RAM) or other volatile storage device 804 (referred to as main memory), coupled to bus 801 for storing information and instructions to be executed by processor 802. Main memory 804 also may be used for storing temporary variables or other intermediate information during execution of instructions by processor 802. The system also comprises a read only memory (ROM) and/or static storage device 806 coupled to bus 801 for storing static information and instructions for processor 802, and a data storage device 807 such as a magnetic disk or optical disk and its corresponding disk drive. Mass data storage device 807 is coupled to bus 801 for storing information and instructions. The system may further be coupled to a display device 821, such as a cathode ray tube (CRT) or a liquid crystal display (LCD) coupled to bus 801 through bus 803 for displaying information to a computer user. An alphanumeric input device 822, including alphanumeric and other keys, may also be coupled to bus 801 through bus 803 for communicating information and command selections to processor 802. An additional user input device is cursor control 823, such as a mouse, a trackball, stylus, or cursor direction keys coupled to bus 801 through bus 803 for communicating direction information and command selections to processor 802, and for controlling cursor movement on display device 821. Another device which may optionally be coupled to bus 801 through bus 803 is a hard copy device 824 which may be used for printing instructions, data, or other information on a medium such as paper, film, or similar types of media. In the preferred embodiment, a communication device 826 is coupled to bus 801 through bus 803 for use in accessing other nodes of a distributed system via a network. This communication device 826 may include any of a number of commercially available networking peripheral devices such as those used for coupling to an Ethernet, token ring, Internet, or wide area network. Note that any or all of the components of the system illustrated in FIG. 12 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer or a Sun® SPARC Workstation. Processor 102 may be one of the X86 compatible microprocessors such as the PENTIUM® brand microprocessors manufactured by INTEL® Corporation of Santa Clara, Calif. upon which a conventional operating system such as the Windows 95 brand operating system developed by Microsoft Corporation of Redmond, Wash. is executed.

The control logic or software implementing the present invention can be stored in main memory 804, mass storage device 807, or other storage medium locally accessible to processor 802. Other storage media may include floppy disk drives, memory cards, flash memory, or CD-ROM drives. It will be apparent to those of ordinary skill in the art that the methods and processes described herein can be implemented as software stored in main memory 804 or read only memory 806 and executed by processor 802. This control logic or software may also be resident on an article of manufacture comprising a computer readable medium 808 having computer readable program code embodied therein and being readable by the mass storage device 807 and for causing the processor 802 to coordinate accesses to a storage system in accordance with the teachings herein.

Thus, a configurable and modular image query system is described. Although the present has been described with reference to specific exemplary embodiments, it will be evident that various modifications and alterations may be made to these embodiments without departing from the broader spirit and scope of the invention as set forth in the claims below. Accordingly, the specification and drawings are to be regarded in an illustrative rather than a restrictive sense.

What is claimed is:

1. An image query and storage apparatus comprising:
   a plurality of dynamically linkable feature modules, each of said plurality of feature modules to extract a different set of feature information from an input image and to generate feature specific scoring information;
   a plurality of scoring modules, wherein each scoring module is to generate a composite score from the feature specific scoring information to be generated by the feature modules using a scoring method that is different from the scoring method of the other scoring modules; and
   a database coupled to said plurality of feature modules, said database to include storage for said different set of feature information for each of said plurality of feature modules.

2. The apparatus as claimed in claim 1 wherein each of the plurality of feature modules further includes logic to generate feature specific scoring information.

3. The apparatus as claimed in claim 1 further including a user interface coupled to the plurality of feature modules and the database to provide the input image to the plurality of feature modules.

4. The apparatus as claimed in claim 1 further including a registry coupled to the database to store registration information related to the plurality of feature modules.

5. An image query and storage apparatus comprising:
   a plurality of dynamically linkable feature modules, each of said plurality of feature modules to extract a different set of feature information from an input image; wherein said plurality of feature modules further include logic for generating feature specific scoring information;

a plurality of dynamically linkable scoring modules, each of said plurality of scoring module to generate a different set of scoring information from the feature specific scoring information to be generated by the feature modules using a scoring method that is different from the scoring method of the other scoring modules;

a database coupled to said plurality of feature modules, said database to include storage for said different set of feature information for each of said plurality of feature modules; and a feature manager configured to invoke one or more of said plurality of dynamically linkable feature modules.

6. The apparatus as claimed in claim 5 wherein the feature information includes a feature descriptor.

7. The apparatus as claimed in claim 5 further including a user interface coupled to the feature manager and configured to provide the input image to the plurality of feature modules.

8. The apparatus as claimed in claim 5 further including a registry coupled to the database for storing registration information related to the plurality of feature modules.

9. The apparatus as claimed in claim 5 wherein at least one of the plurality of feature modules includes a steerable filter.

10. The apparatus as claimed in claim 5 wherein at least one of the plurality of scoring modules includes a three-dimensional scoring space.

11. The apparatus as claimed in claim 5 wherein said database includes a plurality of databases, each to contain a separate set of searchable images.

12. A method for storing and querying images by content, the method comprising:

receiving an input image;

invoking one or more of a plurality of dynamically linkable feature modules, each of said plurality of feature modules extracting a different set of feature information from the input image and generating feature specific scoring information;

generating feature specific scoring information in a plurality of dynamically linkable scoring modules, each of said plurality of scoring modules generating a different set of scoring information from the feature specific scoring information generated by the feature modules; and storing said different set of feature information for each of said plurality of feature modules.

13. The method as claimed in claim 12 wherein the feature information includes a feature descriptor.

14. The method as claimed in claim 12 further including receiving user input identifying the input image.

15. The method as claimed in claim 12 further including storing registration information related to the plurality of feature modules.

16. The method as claimed in claim 12 wherein at least one of the plurality of feature modules includes a steerable filter.

17. The method as claimed in claim 12 wherein at least one of the plurality of scoring modules includes a three-dimensional scoring space.

18. The method as claimed in claim 12 further including storing said different set of feature information in a plurality of databases, each containing a separate set of searchable images.

19. An article of manufacture for use with a computer system for storing and querying images by content, the article of manufacture having computer useable program code embodied therein, said program code comprising:

a first code segment for receiving an input image;

a second code segment for invoking one or more of a plurality of dynamically linkable feature modules, each of said plurality of feature modules extracting a different set of feature information from the input image and generating feature specific scoring information;

a third code segment for generating feature specific scoring information in a plurality of dynamically linkable scoring modules, each of said plurality of scoring modules generating a different set of scoring information from the feature specific scoring information generated by the feature modules; and a fourth code segment for storing said different set of feature information for each of said plurality of feature modules.

20. An image query and storage apparatus comprising:

a plurality of dynamically linkable feature modules, each of said plurality of feature modules comprising an image storage, a feature image analyzer, a query image storage, a feature score generator, a feature score storage, and a feature descriptor, each of the plurality of feature modules to extract a different set of feature information from an input image wherein said plurality of feature modules further include logic for generating feature specific scoring information;

a plurality of dynamically linkable scoring modules, each of said plurality of scoring modules to generate a different set of scoring information from the feature specific scoring information to be generated by the feature modules; and a database coupled to said plurality of feature modules, said database to include storage for said different set of feature information for each of said plurality of feature modules.

21. The apparatus as claimed in claim 20 wherein the plurality of feature modules further include logic for generating feature specific scoring information.

22. The apparatus as claimed in claim 20 further including a user interface coupled to the plurality of feature modules and the database for providing the input image to the plurality of feature modules.

23. The apparatus as claimed in claim 20 further including a registry coupled to the database for storing registration information related to the plurality of feature modules.

24. An image query and storage apparatus comprising:

a plurality of dynamically linkable feature modules, each of said plurality of feature modules comprising an image storage, a feature image analyzer, a query image storage, a feature score generator, a feature score storage, and a feature descriptor; and each of the plurality of feature modules to extract a different set of feature information from an input image wherein said plurality of feature modules further include logic for generating feature specific scoring information;

a plurality of dynamically linkable scoring modules, each of said plurality of scoring modules to generate a different set of scoring information from the feature specific scoring information to be generated by the feature modules;

a database coupled to said plurality of feature modules, said database to include storage for said different set of feature information for each of said plurality of feature modules; and a feature manager configured to invoke one or more of said plurality of dynamically linkable feature modules.

25. The apparatus as claimed in claim 24 wherein the feature information includes a feature descriptor.

26. The apparatus as claimed in claim 24 further including a user interface coupled to the feature manager and configured to provide the input image to the plurality of feature modules.

27. The apparatus as claimed in claim 24 further including a registry coupled to the database for storing registration information related to the plurality of feature modules.

28. The apparatus as claimed in claim 24 wherein at least one of the plurality of feature modules includes a steerable filter.

29. The apparatus as claimed in claim 24 wherein at least one of the plurality of scoring modules includes a three-dimensional scoring space.

30. The apparatus as claimed in claim 24 wherein said database includes a plurality of databases, each to contain a separate set of searchable images.

31. A method for storing and querying images by content, the method comprising:

receiving an input image;

invoking one or more of a plurality of dynamically linkable feature modules, each of said plurality of feature modules comprising an image storage, a feature image analyzer, a query image storage, a feature score generator, a feature score storage, and a feature descriptor; and each of the plurality of feature modules extracting a different set of feature information from the input image and generating feature specific scoring information;

generating feature specific scoring information in a plurality of dynamically linkable scoring modules, each of said plurality of scoring modules generating a different set of scoring information from the feature specific scoring information generated by the feature modules; and storing said different set of feature information for each of said plurality of feature modules.

32. The method as claimed in claim 31 wherein the feature information includes a feature descriptor.

33. The method as claimed in claim 31 further including receiving user input identifying the input image.

34. The method as claimed in claim 31 further including storing registration information related to the plurality of feature modules.

35. The method as claimed in claim 31 wherein at least one of the plurality of feature modules includes a steerable filter.

36. The apparatus as claimed in claim 31 wherein at least one of the plurality of scoring modules includes a three-dimensional scoring space.

37. The method as claimed in claim 31 further including storing said different set of feature information in a plurality of databases, each containing a separate set of searchable images.

38. An article of manufacture for use with a computer system for storing and querying images by content, the article of manufacture having computer useable program code embodied therein, and said program code comprising:

a first code segment for receiving an input image and generating feature specific scoring information;

a second code segment for generating feature specific scoring information in a plurality of dynamically linkable scoring modules, each of said plurality of scoring modules generating a different set of scoring information from the feature specific scoring information generated by the feature modules;

a third code segment for invoking one or more of a plurality of dynamically linkable feature modules, each of said plurality of feature modules comprising an image storage, a feature image analyzer, a query image storage, a feature score generator, a feature score storage, and a feature descriptor; and each of the plurality of feature modules extracting a different set of feature information from the input image; and a fourth code segment for storing said different set of feature information for each of said plurality of feature modules.

\* \* \* \* \*